United States Patent [19]

Lee

[11] 4,010,349
[45] Mar. 1, 1977

[54] PROOFING CABINET
[75] Inventor: Robert E. Lee, Huntington, Ind.
[73] Assignee: Lincoln Manufacturing Company, Inc., Fort Wayne, Ind.
[22] Filed: Feb. 27, 1975
[21] Appl. No.: 553,619
[52] U.S. Cl. .................................. 219/401; 99/474; 126/20; 126/281; 219/272; 219/362; 219/400; 312/236
[51] Int. Cl.² .................... H05B 1/00; A21C 13/00
[58] Field of Search .......... 219/272, 326, 333, 362, 219/385, 386, 399, 400, 401, 403, 408, 442, 447, 523, 275, 276; 126/20, 20.1, 20.2, 113, 281, 369, 369.1; 312/31, 236; 99/467, 468, 473, 480, 481, 482, 483, 474; 426/496; 261/142

[56] References Cited
UNITED STATES PATENTS

| 937,067 | 10/1909 | Grafton | 126/281 X |
|---|---|---|---|
| 1,555,321 | 9/1925 | Woodson | 219/400 |
| 1,815,088 | 7/1931 | Allen et al. | 219/403 X |
| 2,499,525 | 3/1950 | Person | 219/362 |
| 2,898,437 | 8/1959 | McFarland | 219/400 X |
| 3,030,486 | 4/1962 | Lashley | 219/401 X |
| 3,205,033 | 9/1965 | Stentz | 312/236 |
| 3,387,114 | 6/1968 | Brake, Jr. et al. | 219/386 |
| 3,395,267 | 7/1968 | MacKay | 219/403 X |
| 3,456,598 | 7/1969 | MacKay | 99/483 |
| 3,518,949 | 7/1970 | Stock | 99/483 X |

Primary Examiner—A. Bartis
Attorney, Agent, or Firm—Albert L. Jeffers; Roger M. Rickert

[57] ABSTRACT

A proofing cabinet for treatment of dough preparatory to baking in which an upright cabinet having a swingable front door has support brackets on the inside for receiving trays of dough while in the bottom of the cabinet there is detachably inserted an assembly consisting of a lower portion which contains an electrically heated tray for receiving water thereby to supply water vapor to the interior of the cabinet while upstanding from the rear end of the assembly is an electric heater contained within a vertical flue chamber. The vertical flue chamber with the electric heater therein induces circulatory flow of air within the cabinet while maintaining the air at such temperature that condensation of water vapor inside the cabinet walls is inhibited.

8 Claims, 6 Drawing Figures

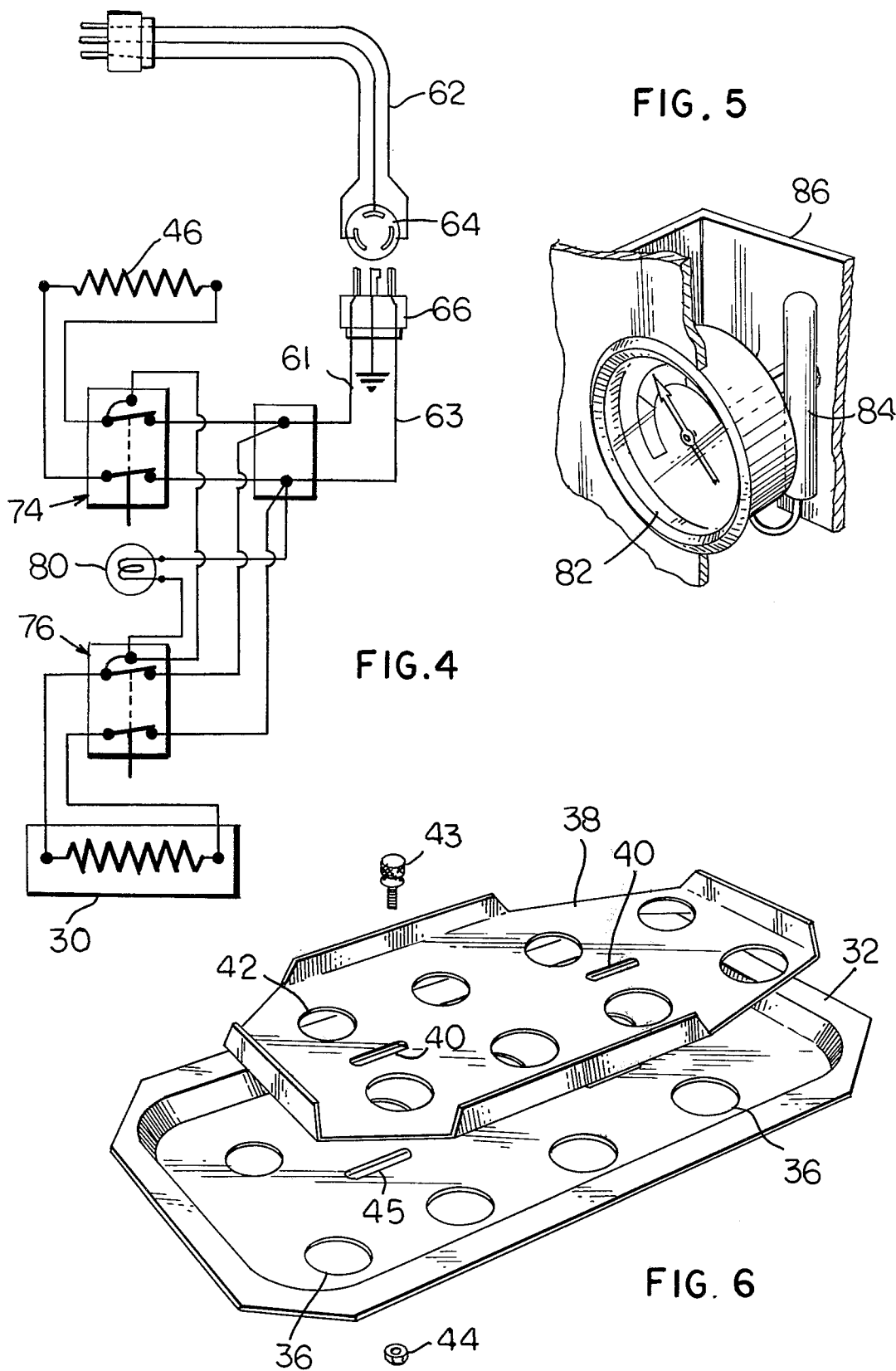

PROOFING CABINET

The present invention relates to improvements in proofing cabinets and is particularly concerned with a proofing cabinet so constructed and arranged that condensation of moisture on the inner sides of the walls is inhibited.

Proofing cabinets are known and are quite often employed in schools and hospitals and small bakeries where baking on a fairly small scale is carried out. A proofing cabinet is an enclosure in which the dough to be baked is placed preparatory to baking and is held in an atmosphere of a predetermined temperature and which is humidified by the supply of water vapor thereto. The particular temperature maintained within the proofing cabinet and the amount that the air is humidified depends upon the particular circumstances in connection with treatment of the dough.

Heretofore, problems have been encountered in respect of such proofing cabinets because the water vapor supplied to the air within the cabinet to humidify the air tended to condense on the inner walls of the cabinet and run down toward the bottom of the cabinet and sometimes out of the cabinet into the surrounding area.

With the foregoing in mind, a particular object of the present invention is the provision of a proofing cabinet in which the problem of condensation of water on the insides of the walls thereof is eliminated.

Another object is the provision of a proofing cabinet in which the air in the cabinet is caused to circulate while simultaneously being heated thereby inhibiting the condensation of moisture on the insides of the cabinet walls.

A still further object is the provision of a proofing cabinet having an auxiliary and independently controlled electric heater therein which can be employed for maintaining the cabinet at such a temperature that it can be used for the temporary storage of hot foods.

BRIEF SUMMARY OF THE INVENTION

According to the present invention, a proofing cabinet is provided which is substantially conventional in respect of the cabinet dimensions and which is in the form of a rather tall cabinet structure having a swingable front door for access to the interior of the cabinet. The insides of the side walls of the cabinet carry rails for slidably receiving support trays on which dough is to be placed which is to be proofed.

According to the present invention, the cabinet has mounted therein on the bottom wall an assembly which consists of a horizontal portion extending from side to side of the cabinet and in the fore and aft direction and in about in the middle of which there is a tray for receiving water. An electric heater, preferably of the cartridge type, is disposed in the tray and maintains the temperature of the water therein at such a level that the water will evaporate at a desired rate.

The tray has an apertured lid and on top of the lid is an apertured slider plate so that adjustment of the slider plate on the lid will vary the effective size of the apertures thereby to control the rate at which water vapor comes off the water in the tray.

Upstanding from the rearward end of the aforementioned horizontal portion of the assembly is an electric heating element which may be of the well known metal clad plate type. This heating element is disposed in a vertical plane extending transversely to the cabinet and is disposed inside a flue arrangement attached to the rearward end of the horizontal portion of the assembly so that the flue is closely adjacent the back wall of the cabinet when the assembly is mounted in the cabinet.

The flue consists of a first panel on the rearward side of the electric heating element and a second panel connected to the first panel and disposed on the forward side of the heating element, both panels preferably being spaced from the heating element to leave a substantial space in the flue for air flow therein.

The panel on the forward side of the heating element terminates above the level of the aforementioned horizontal portion and there may be an inclined plate leading downwardly and forwardly from near the lower edge of the aforementioned second panel and also terminating above the horizontal portion and somewhat rearwardly from the rearward end of the aforementioned tray.

The provision of the flue with the electric heater therein causes air in the cabinet generally to flow upwardly along the rear wall and downwardly along the front wall. This generally circulatory movement of the air within the cabinet together with the heating of the air by the electric heater not only distributes the air throughout the cabinet but, also, inhibits the condensation of moisture supplied to the air from the aforementioned tray from condensing on the inside surfaces of the walls.

The trays on which the dough is placed for proofing are preferably perforated, and this further assists in distribution of the air in the cabinet so as to maintain uniform conditions throughout the cabinet.

The trays which are supported on the aforementioned rails are held in spaced relation at the forward and rearward edges from the rear wall of the cabinet and from the swingable door of the cabinet by vertical abutment members such as angles secured to the rear wall and the inside of the front door and protruding therefrom.

The assembly referred to and consisting of the horizontal portion with the tray and the vertical portion with the electric heater is slidable into and out of the cabinet as a unit and includes a panel at the front end carrying switches connected in circuit with the aforementioned electric heaters and also a pilot light which will show when either of the heaters is energized. The switches preferably are adjustable for controlling the amount of power supplied to either one of the heaters thereby to control the heating of the water in the tray and the temperature of the electric heater in the flue.

The electric power to the assembly is brought into the assembly through cooperating elements of a separable electrical connector, one of which is mounted in the rear end of the cabinet and the other of which is mounted in a rear end portion of the assembly. When the assembly is pushed into place in the cabinet, the elements of the connector are fitted together and one assembly is drawn out of the cabinet and the elements of the cabinet separate.

Preferably, the aforementioned assembly is held in the cabinet by fastening means which may extend through the back wall of the cabinet. The easy removability of the assembly permits ready repair of adjustment thereof and, at the same time, permits the inside of the cabinet to be maintained in a highly sanitary condition in a simple manner.

The exact nature of the present invention will become more apparent upon reference to the following detailed specification taken in connection with the accompanying drawings in which:

FIG. 4 is a schematic view showing the electric circuit for the power unit of the cabinet.

FIG. 5 is a perspective view showing a temperature indicating gauge which is mounted in the door of the cabinet.

FIG. 6 is a perspective view showing the apertured lid for the water tray and the slider plate mounted thereon which is adjustable for varying the size of the apertures in the lid.

DETAILED DESCRIPTION OF THE INVENTION

Figure 1:
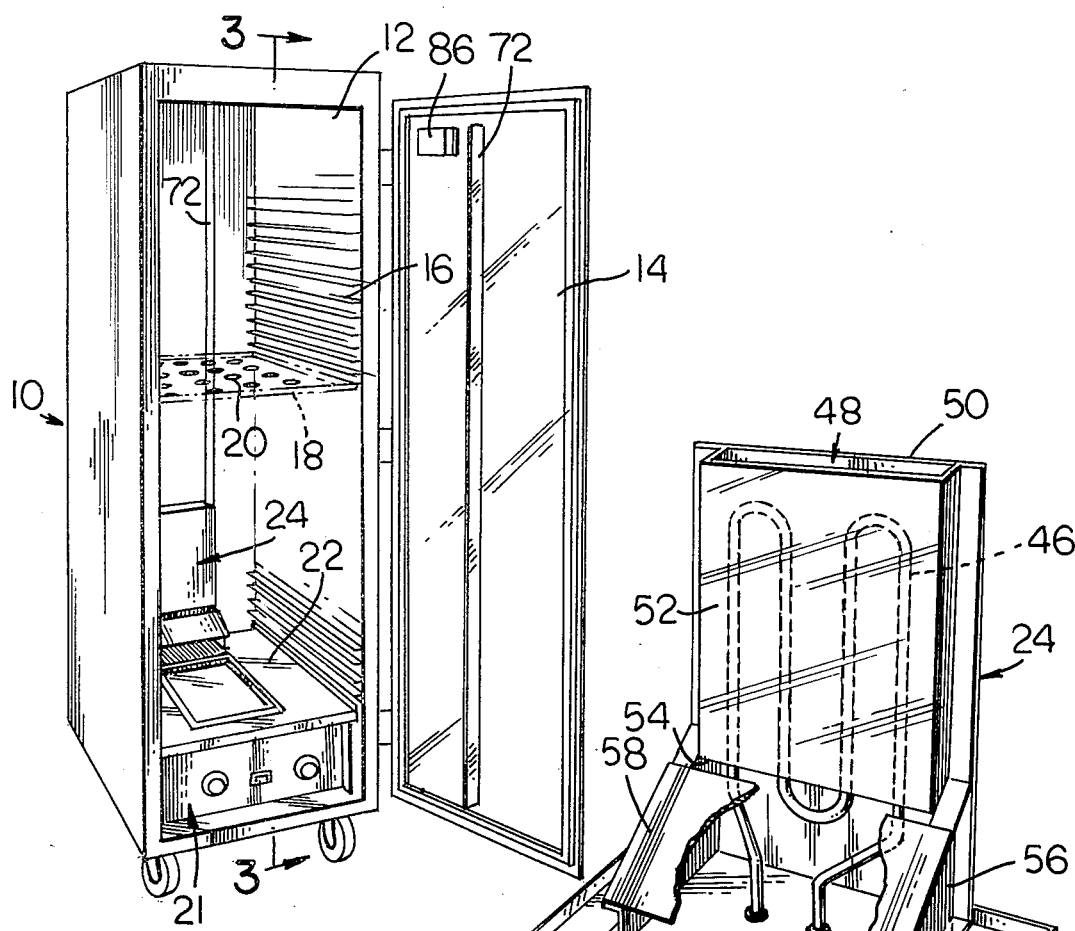
FIG. 1 is a perspective view of a proofing cabinet according to the present invention with the front door open.

Referring to the drawings somewhat more in detail, the proofing cabinet according to the present invention is generally indicated at 10 in FIG. 1 and comprises top, bottom and rear walls defining a compartment 12 while a swingable front door 14 is provided on the cabinet for closing the compartment.

Figure 3:
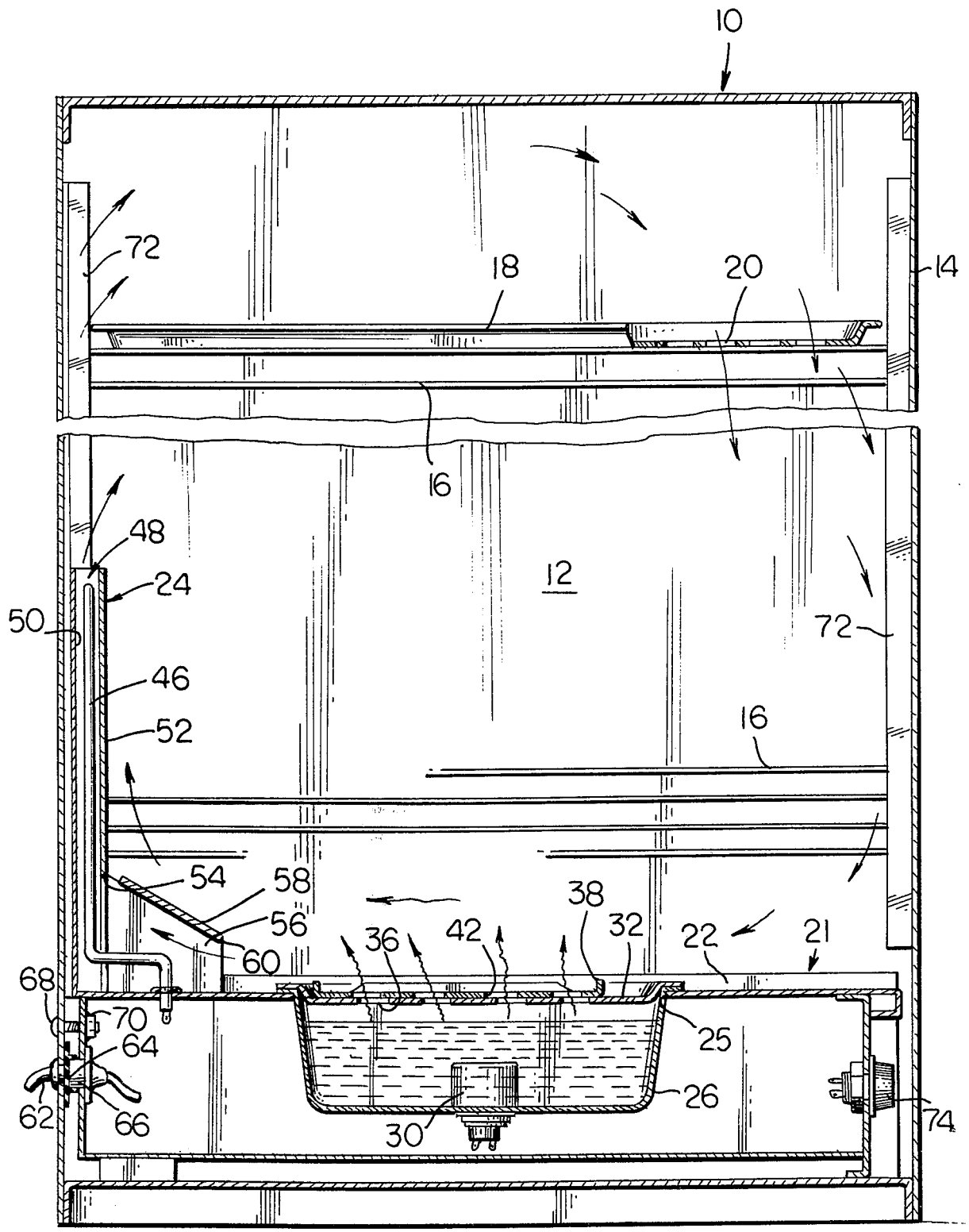
FIG. 3 is a vertical longitudinal section indicated by line III—III on FIG. 1 drawn at enlarged scale and partly broken out to decrease the height of the view.

Within compartment 12 on the insides of the side walls are the fore and aft extending support rails 16 adapted for supportingly receiving trays 18 and which trays, as will best be seen in FIG. 3, are provided with apertures 20 through which air can circulate.

A particular feature of the present invention is to be found in a power unit assembly generally indicated at 21 which is slid into the cabinet from the front at the bottom. This assembly, shown more in detail in FIGS. 2 and 3, comprises a substantially horizontally extending portion 22 and a substantially vertical portion 24 upstanding from the rearward end of the horizontal portion.

The horizontal portion is substantially rectangular in cross section and has an opening 25 in about the middle thereof for receiving a water tank or tray 26 having a peripheral flange extending outwardly around aperture 25 for support. The water tray or tank is held on the top panel of horizontal portion 22 as by screws 28 in the corners of the tray.

The tray is adapted for receiving water and mounted on the bottom wall of the tray and upstanding into the space which receives the water is a cartridge type electric heater 30 to which electric power is supplied through the bottom.

The tray has a lid or cover 32 mounted thereon which is recessed in the region directly over the tray while having a flanged periphery and being clamped in place by clamps or clips 34 secured to the top wall of horizontal portion 22 and overlying the ends of lid or cover 32.

The lid or cover 32 has apertures 36 therein so that when heating element 30 is energized and water evaporates from the body of water in the tray 26, it will pass upwardly through apertures 36. A slide member 38 is mounted on top of the lid or cover 32 and is movable therealong as by means of slots 40 through which studs or screws extend into the lid or cover 32. Slide plate 38 also has apertures therein as indicated at 42 and by movement of the slider on lid 32 the effective size of the apertures in the lid can be varied.

Near the rearward end of the horizontal portion 22 of the power assembly, there is upstanding vertically a second portion 24 of the power assembly and which consists of a metal clad electric heater 46 disposed in a vertical plane and a flue 48 enclosing the electric heater 46 and providing a passage for the flow of air upwardly over the electric heater.

The flue 48 is made up of a back panel 50 upstanding at the extreme rearward end of the horizontal portion of the power assembly and disposed behind electric heater 46 and a second panel 52 disposed in front of electric heater 46 and connected at the edges to the first mentioned panel 50. Panel 50 extends downwardly completely to the top panel of the horizontal portion of the assembly but forward panel 52 terminates at the bottom edge 54 above the top panel of the horizontal portion of the assembly.

Support for the flue 48 may be provided by the angular brackets 56 at each side and which brackets may support a further panel 58 leading downwardly and forwardly from the lower edge 54 of panel 52. The lowermost forward edge 60 of panel 58 terminates above and to the rear of the region where water vapor emerges from tank or tray 26 when heating element 30 is energized.

The provision of the flue provides that air will move generally rearwardly over the top of the horizontal portion 22 of the power unit assembly and upwardly through the flue toward the top of the cabinet and also upwardly on the forward side of panel 52 which also becomes heated from the electric heater.

The air thus moves generally upwardly in the rearward portion of the cabinet and across the upper region thereof and downwardly along the inside of the front door of the cabinet. The electric heater 46 adds sufficient heat to the air which is humidified by the water evaporating from tank 26 to maintain the water vapor air in vapor form thereby inhibiting the condensation of the water vapor on the insides of the walls of the cabinet.

The power supply for heating element 30 and electric heater 46 is effected by way of an electric cable 62 connected to an element 64 of a separable electrical connector mounted on the rearward wall of the cabinet. This electrical connector includes another element 66 mounted on the rearward portion of the power unit assembly so that when the power unit assembly is inserted into the cabinet, the elements of the unit interengage and when the unit is withdrawn from the cabinet, the connector elements are disengaged.

The power unit assembly is preferably held in place by a screw 68 extending through the rearward wall of the cabinet and engaging a nut 70 which is captive on the power unit assembly as by being welded in place thereon.

In order to enhance the circulation of air within the cabinet, angle members 72 are mounted on the inside of the rear wall of the cabinet and on the back of the front door of the cabinet so that when the front door is closed the trays 18 are confined between the angles and thereby held in spaced relation to the rear wall of the cabinet and the inside of the front door thereof.

Figure 2:
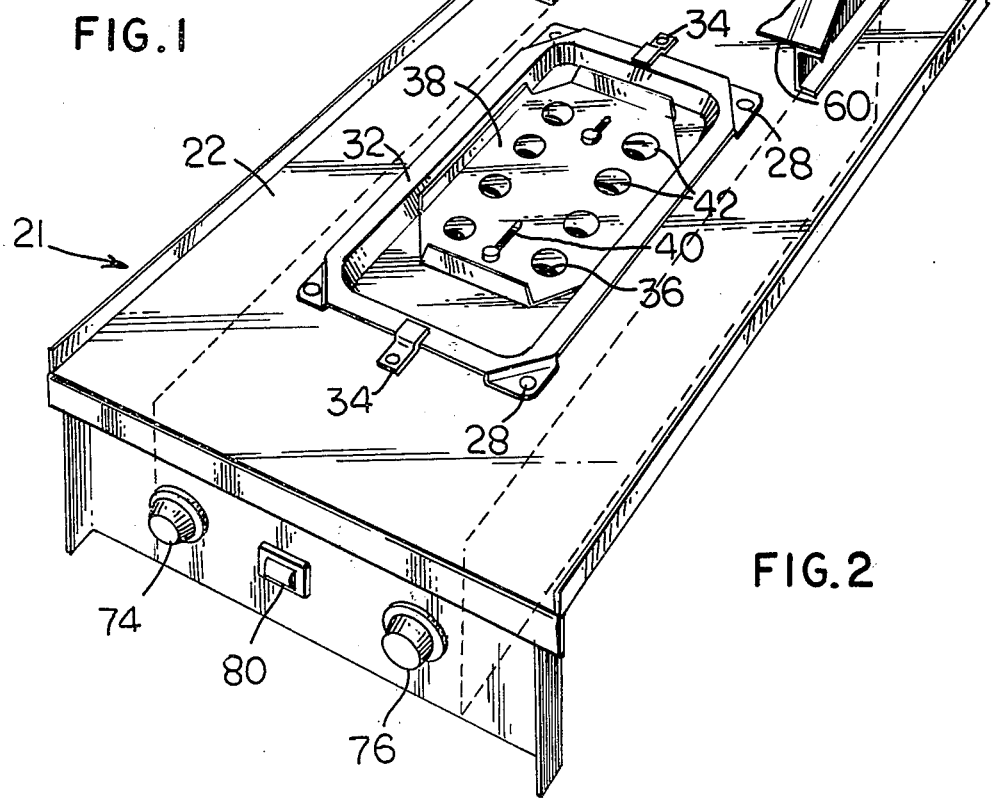
FIG. 2 is a perspective view of the removable power unit disposed in the bottom portion of the cabinet and partly broken away.

The control circuit for the power unit is shown schematically in FIG. 6 wherein it will be seen that the power lines 61 and 63 are connected to terminals of switches 74 and 76 which are mounted on the depending front panel of the control unit as shown in FIG. 2. Switch 74, when closed, energizes electric heater 46 and can be adjusted to control the amount of power supplied to the heater.

Similarly, when switch 76 is closed, cartridge heater 30 is energized and the switch can be adjusted to control the amount of power supplied to the cartridge heater. A pilot light 80 is also mounted on the dependent front panel of the power unit and becomes illuminated when either of switches 74 and 76 are closed.

FIG. 5 shows schematically how an indicating thermometer 82 could be mounted in the front door with a sensing bulb 84 pertaining thereto disposed inside a shield 86 on the back of the front door of the cabinet so that the air circulating in the cabinet will flow downwardly inside the shield and influence the sensing bulb.

The cabinet, when used as a proofing cabinet, has both of the heating element 46 and the cartridge heater 30 energized, but it is also possible to employ the cabinet for temporary storage of hot foods in which case cartridge 30 is preferably de-energized while switch 74 is adjusted to increase the temperature of the heating element 46.

Proofing of dough is normally carried out within a temperature range of from about 90° Fahrenheit to about 100° Fahrenheit. Evaporation of water from the tank is accomplished by maintaining the heater element 30 at the proper temperature. For example, at about 180° to 190' Fahrenheit. The adjustment provided for the supply of power to the heating element 30, however, permits both lower and higher temperatures, for example, from a lower limit of around 100° Fahrenheit up to substantially boiling temperature.

The electric heating unit in the cabinet is also variable in temperature by adjustment of the pertaining switch, for example, from about 60° Fahrenheit up to about 214° Fahrenheit.

What is claimed is:

1. A cabinet, especially for use in proofing dough prior to baking, and comprising; a cabinet structure having side, rear, top and bottom walls, a swingable front door and support means distributed along the side walls on the inside for supporting dough trays, first means near the bottom wall of the cabinet for generating water vapor to humidify the interior of the cabinet including a tray having electric heating means and adapted for receiving water, and second means near one wall of the cabinet for supplying heat to the interior of the cabinet to inhibit condensation of the generated water vapor therein including an electric heater in a vertical plane and at least one vertical panel adjacent to the last mentioned electric heater defining a vertical air flow channel in which said last mentioned electric heater is disposed, said first and second means being parts of an assembly removable from said cabinet as a unit, said assembly comprising a frame having a horizontal portion slidable into the cabinet from the front above said bottom wall and a vertical portion upstanding from the rearward end of said horizontal portion, the tray being disposed in the horizontal portion and the at least one vertical panel comprising a part of said vertical portion with the lower end of the at least one vertical panel terminating above the said horizontal portion to define an air inlet opening to the air flow channel near the lower end of the vertical portion, the vertical portion including an air outlet for discharging heated air from the air flow channel in a direction upwardly along a wall of the cabinet.

2. A cabinet according to claim 1 in which said first means further includes a lid for the tray having openings therein, and a slide plate on the lid also having openings therein and movable on the lid to vary the degree of registration of the openings therein with those on said lid.

3. A cabinet according to claim 1 in which said vertical portion includes a further panel having the rearward edge near the bottom edge of said at least one vertical panel and inclined forwardly and downwardly therefrom and at the forward edge terminating above and rearwardly from the rearward region of said tray.

4. A cabinet according to claim 1 in which said frame comprises a forward portion, and switches carried by said forward portion of said frame and connected in circuit with said electric heating means and said electric heater.

5. A cabinet according to claim 4 in which the power supply leading to said switches is brought in through the rear wall of said cabinet and includes elements of a separable electric connector on the cabinet rear wall and on the rearward portion of said frame so the connector will open when the frame is withdrawn from said cabinet.

6. A cabinet according to claim 1 in which the rear wall of the cabinet and the said door have members protruding therefrom which engage the ends of trays supported in said cabinet on said support mans to center the trays in the cabinet in spaced relation to the rear wall and the said door when the door is closed.

7. A cabinet according to claim 1 which includes perforated trays supported by said support means.

8. A cabinet according to claim 1 in which said horizontal portion includes a top panel, said panel being apertured to receive said tray, and means clamping said tray to said panel.

* * * * *

UNITED STATES PATENT AND TRADEMARK OFFICE
CERTIFICATE OF CORRECTION

PATENT NO. : 4,010,349
DATED : March 1, 1977
INVENTOR(S) : Robert E. Lee

It is certified that error appears in the above-identified patent and that said Letters Patent are hereby corrected as shown below:

Col. 2, line 65 "of" second occurrence, should be -- or --

Col. 5, line 29, "190'" should be --- 190° ---

Col. 6, line 44 (Claim 6) "mans" should be --- means ---

Signed and Sealed this

Twenty-fourth Day of May 1977

[SEAL]

Attest:

RUTH C. MASON
Attesting Officer

C. MARSHALL DANN
Commissioner of Patents and Trademarks